May 9, 1933. G. V. TOMLINSON 1,907,614
FINGER RELEASED PIPE COUPLING
Filed June 18, 1931
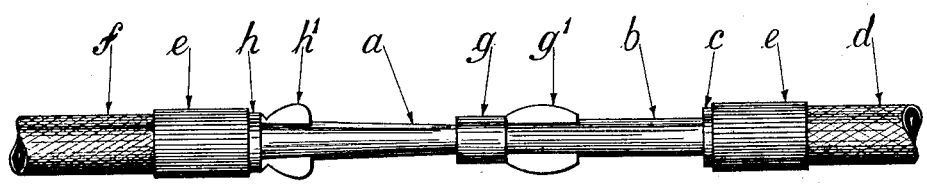
Fig. 1.
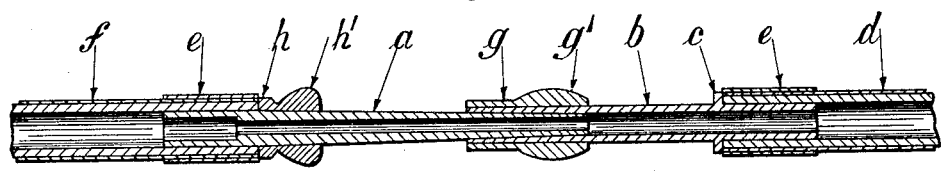
Fig. 2.
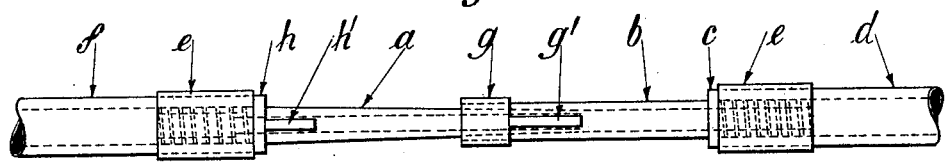
Fig. 3.
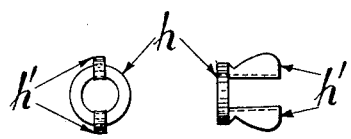   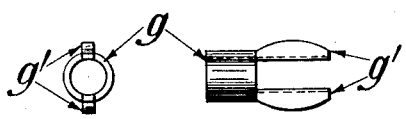
Fig. 4.          Fig. 5.
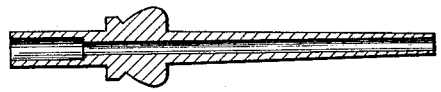
Fig. 6.
Inventor:-
George Vincent Tomlinson
By his Attorney:- Walter Gunn Patented May 9, 1933

1,907,614

UNITED STATES PATENT OFFICE

GEORGE VINCENT TOMLINSON, OF OLDHAM, ENGLAND

FINGER-RELEASED PIPE COUPLING

Application filed June 18, 1931, Serial No. 545,253, and in Great Britain February 2, 1931.

This invention refers to and consists of a pipe coupling adapted to be made and released quickly with the fingers, and without any great exertion of pressure, whilst providing a liquid tight joint. A particular use of the invention is in connecting sections of the flow and return pipes of water cooled dental impression trays, but it may find other applications where a quick connection of comparatively small section piping is required, such as in spraying, painting or colour-washing apparatus.

According to the invention the improved coupling comprises an inner and an outer tubular part each having a flange or collar near one end, and each formed at such end for connection to a section of flexible tubing. The inner part is tapered from the said flange to its other end and such other end is adapted to fit into the outer part, which latter is expanded slightly, so as to give an internal taper to grip the tapered outer face of the inner part.

Each part of the coupling is provided with means to facilitate turning the one on the other to cause mutual engagement, and such turning means may comprise wings, or a knurled or milled cylindrical part, or a hexagonal or other polygonal formation.

The accompanying drawing illustrates the invention,

Fig. 1 being an elevation of a pipe coupling made according thereto,

Fig. 2 a longitudinal sectional elevation, and Fig. 3 a plan.

Figs. 4 and 5 are end and side views of detail parts hereinafter described.

Fig. 6 is a sectional elevation of a modification hereinafter described.

As shown, the improved coupling comprises the inner and outer parts $a$ and $b$ respectively. The outer part $b$ has an integral collar $c$ near one end, and that end is provided with a spiral groove to engage a flexible tube $d$ into which the end is placed, the tube being secured in position by having the crimped metal sleeve $e$ pressed thereon in known manner. The member $b$ has a through bore which is parallel-sided for the major portion of its length and tapered outwardly towards the end furthest from the collar $c$, to receive and hold the tapered member $a$. The said member $a$ is tapered from its smaller end to a point near its other end, the remaining length being parallel and provided with a spiral groove to engage a further flexible tube $f$ secured thereto in like manner to the securing of the tube $d$ to the member $b$. The member $a$ also has a through bore, this being of larger diameter in the parallel part of the tube than in the tapered part, as shown in Fig. 2.

Wings are provided on the parts $a$ and $b$ to facilitate turning one relatively to and in engagement with the other, those on the outer part $b$ of the coupling comprising extensions $g^1$ on the end of a ring or bush $g$ secured to the free or "joint" end of such part, (see Fig. 5), the wings lying alongside the tubular coupling member. The wings on the inner part of the coupling consist of extensions $h^1$ projecting from one face of the flange or collar $h$ (see Fig. 4). The tapered tubular portion of the inner coupling member may have slots in its larger end to fit over the wings which project from the flange, and be soldered or otherwise secured thereto.

The amount of taper will preferably be very slight so as to give an effective frictional grip. In one example the tapered part of the inner coupling member is 1⅝″ long and varies from 3/16″ to ⅛″ in diameter, the outer coupling member being adapted to engage therewith for a distance of ½″.

The whole coupling may be silver or chromium plated, or otherwise finished to give a neat appearance.

In a modification, each half-part of the coupling may be in one piece, with its flange and turning means (ears etc.), as shown in Fig. 6, instead of being built up as in the previous example.

The invention is specially designed for small bore tubing and by reason of the tapered formation and the wings, or their equivalent, a fluid tight joint may be quickly and easily made or broken.

What I claim is:—

1. A finger-released coupling for the small diameter flexible pipes used in dental surgery, comprising two tubular metal members each grooved spirally at one end for attachment to a flexible pipe and having a flange to abut against the end of the flexible pipe, one member having a slight exterior taper and fitting within the other, which has a slight interior taper, to provide a firm frictional grip resisting relative endwise movement, a ring with lateral ears on the otherwise plain end of the outer member, the total length of the ring and ears being equal to the distance by which the inner member enters the outer member, and said ring and ears preventing swelling of the outer member at that end, and further ears on the flange of the inner member at the end adjoining the flexible tube.

2. In a finger-released pipe coupling as claimed in claim 1, a one piece exteriorly tapered inner member, flange and lateral ears, having a larger internal diameter in the spirally grooved end than through the tapered and flanged parts.

In testimony whereof I have signed my name to this specification.

GEORGE VINCENT TOMLINSON.